(No Model.)
A. B. HOLSON.
SPEED MEASURE.
No. 561,053. Patented May 26, 1896.
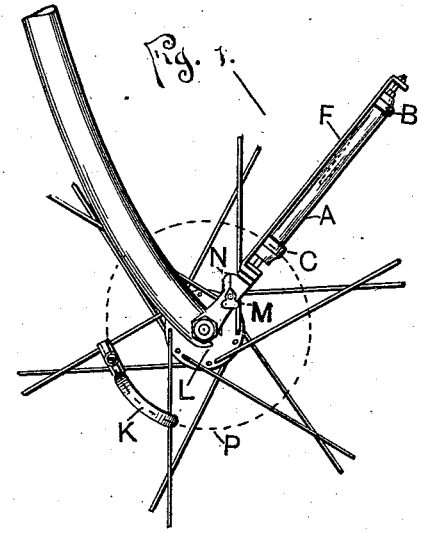
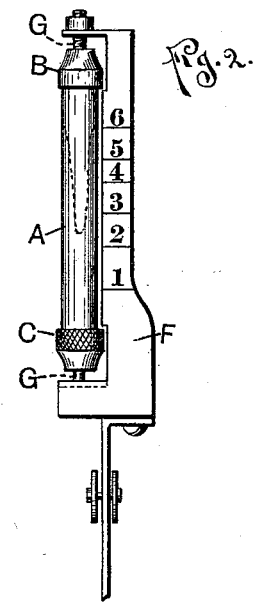
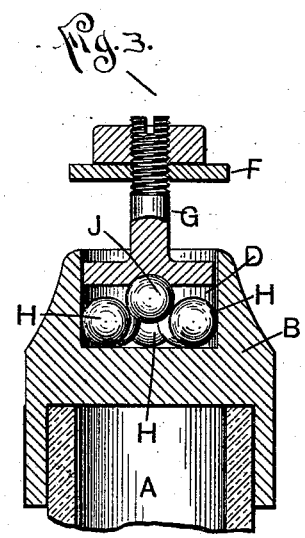
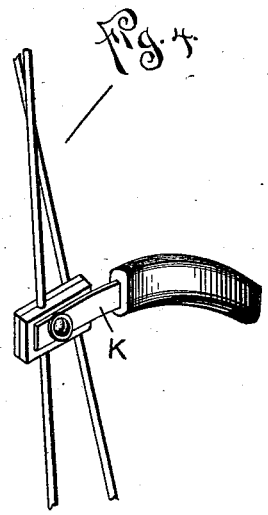
Witnesses:
J. B. Weir
H. H. Hale
Inventor:
Albert B. Holson.
by his atty. Oscar Snell

UNITED STATES PATENT OFFICE.

ALBERT B. HOLSON, OF CHICAGO, ILLINOIS, ASSIGNOR TO THE HOLSON MANUFACTURING COMPANY, OF SAME PLACE.

SPEED-MEASURE.

SPECIFICATION forming part of Letters Patent No. 561,053, dated May 26, 1896.

Application filed December 12, 1895. Serial No. 571,856. (No model.)

*To all whom it may concern:*

Be it known that I, ALBERT B. HOLSON, a citizen of the United States, residing at Chicago, in the county of Cook and State of Illinois, have invented a new and useful Pace-Indicator, of which the following is a specification.

My invention relates to pace-indicators which are provided with a rotatory glass or celluloid tube containing liquid which indicates the speed by the position of the surface thereof, which varies at different speeds in proportion to the difference in centrifugal force.

One object of my invention is to provide a construction which is particularly adapted to use in connection with an ordinary bicycle, but which may be used for other purposes by a few slight variations.

Another object is to provide a construction which is adapted to reduce friction to an almost inappreciable degree.

In the drawings, Figure 1 is a side elevation of the lower part of the front fork of a bicycle with a pace-indicator attached thereto, and also the central portion of the front wheel of a bicycle, showing an actuating-finger attached to two of the spokes thereof, these two attached parts embodying my improvements. Fig. 2 is a side elevation of the indicator and the holder in which it is pivotally mounted. Fig. 3 is a vertical axial section of either one of the ends of the indicator, showing the ball-bearing and pivotal mounting thereof. Fig. 4 is a perspective view of the actuating-finger for transmitting the motion of the bicycle-wheel to the indicator-tube.

Similar letters indicate like parts throughout the several views.

A is a glass or celluloid tube of the indicator, which is partly filled with a liquid material. The ends of tube A are closed by means of heads B and C. At the outer ends of each head B and C is a cavity D of cylindrical form, Fig. 3, and attached to projections from the holder F are adjustable step-bearings G.

Referring to Fig. 3, there is a circle of balls H, which contact the bottom and side wall of cavity D, upon which circle of balls rests one ball J, which contacts step G. Each step-bearing being adjustable a very easy contact may be attained. Usually the lower head C is milled, as shown in Fig. 2, and at K is shown the actuating-finger, which is made of spring metal and is covered by either rubber or leather, which during each revolution of the bicycle-wheel L contacts the milled head C and causes the indicator-tube to rotate. This intermittent action of the actuating-finger when a bicycle is traveling at anything like a rapid speed causes the indicator-tube to revolve at substantially a regular speed in unison with that of the bicycle-wheel, and the contact being yielding and of very short duration the power required to rotate the indicator is reduced to an amount hardly appreciable. The side of the holder F is graduated, as shown, to indicate any rate of speed that practice may dictate. It will be noticed, by reference to Fig. 1, that the indicator-tube is placed out of the vertical position, which is to enable the bicycle-rider to more easily read the pace he is going, since the graduations on holder F in this inclined position are presented square to the line of sight. At M is an indicator, which is pivotally mounted on the side of the indicator-holder to show at what angle the indicator-tube A is to be set. The lower end of indicator M is heavier than the top pointed end, so that gravity serves to hold it in a vertical position, and an angular line at N on the holder F must register with the point of indicator M to show the right angle to secure the instrument to the bicycle.

The broken line P, Fig. 1, indicates the circle described by the actuating-finger K in contacting the lower head C of the indicator. One great advantage in the use of the segmental form of the actuating-finger K is that it may be easily attached to the wheel of any bicycle, is not costly, and does not perceptibly injure the light graceful appearance of the wheel, as would be the case by the attachment of a ring of a size as large as indicated by the circular broken line P. In case the indicator-tube should be mounted for any reason in a vertical position, the graduations on the holder F would not be suitable if intended for the tube being placed at the angle shown in Fig. 1, since the liquid at such an angle will flow out by the same number of revolutions to a greater height in the tube than when the tube is placed vertically. Therefore the indicator M is a necessity, so that the tube will be secured in the same position or angle to the vertical that was intended when the graduation-marks on the holder were made.

I claim as my invention—

1. In a pace-indicator for bicycles, the combination with the liquid rotatory indicator, of a friction actuating-finger attached to the bicycle-wheel and adapted to rotate the indicator-tube by intermittent frictional contact, in the manner substantially as described.

2. The combination in a pace-indicator for bicycles having a rotatory indicating-tube with liquid therein and attached at less than a vertical angle to the bicycle, of a gravity-indicator M pivotally mounted upon the tube-holder and adapted to indicate the proper angle from the vertical to be subtended by the tube, for the purpose stated.

In testimony that I claim the foregoing I have hereunto set my hand, this 10th day of December, 1895, in the presence of witnesses.

ALBERT B. HOLSON.

Witnesses:
RICHARD T. GREENER,
J. L. TURNER.